April 22, 1969  N. J. PRESTON  3,439,700
REFUELLING AIRCRAFT
Filed July 5, 1966

United States Patent Office 3,439,700
Patented Apr. 22, 1969

3,439,700
REFUELLING AIRCRAFT
Norman J. Preston, Earley, near Reading, England, assignor to Esso Research and Engineering Company, a corporation of Delaware
Filed July 5, 1966, Ser. No. 562,787
Claims priority, application Great Britain, July 8, 1965, 29,062/65
Int. Cl. B60p 3/00; F16l 3/20
U.S. Cl. 137—351                                    2 Claims

ABSTRACT OF THE DISCLOSURE

This invention is directed to an aircraft refuelling apparatus characterized by a fuel hose supporting means which comprises a telescoping tubular arm housing the fuel line. The arm may be extended and retracted by suitable automated means.

---

This invention relates to improvements in liquid fuel delivery, particularly in refuelling aircraft.

Although the invention is not limited thereto, it is particularly suited to refuelling aircraft. Modern aircraft are continually increasing in size and range of flight with the result that they carry, and use, a vast amount of liquid fuel; for example a modern trans-continental airliner may carry up to 20,000 gallons, or more, of fuel. The fuel is usually carried, for the most part, in wings of the aircraft and the filling apertures are customarily located in the wings; generally two filling apertures are provided in each wing in the conventional low wing monoplane type of aircraft.

The fuel for refuelling is carried to the aircraft, at the airport, in tanker vehicles designed for the purpose and is pumped from the tanker vehicles through hoses normally carried by the vehicles, which are attached to the refuelling apertures in the wings of the aircraft. Usually each tanker vehicle carries two hoses coiled on reels and, when the tanker is at the aircraft for refuelling, the hoses are uncoiled and attached to the fuelling apertures. In view of the large amount of fuel to be pumped to the aircraft fuel tanks the hoses must be of substantial diameter and comparatively long. They are thus heavy to handle. Furthermore, since the aircraft wings are at some height above the ground a platform must be provided to enable the operator to attach the hoses to the fuelling apertures in the wings of the aircraft. It is customary to attach the two hoses, customarily carried by a tanker, to each of two of the fuelling apertures and, as there are four such apertures, two in each wing, it is normal practice to provide two tankers for each refuelling operation when a large aircraft is being refuelled. Even so, the time required to fuel a large aircraft can be in the region of 30 minutes and, at a busy airport, this can be an undesirably long time.

There are a number of disadvantages in the present method of refuelling stemming from the type of equipment employed. Because of the length, diameter, and weight of the hoses that have to be used, a number of men, usually five, are required to handle them, it being appreciated that the hoses are full of fuel and that thus the weight of the fuel is added to the weight of the hoses. Furthermore, because of their length the hoses have to be coiled on reels carried by the tanker. These reels not only occupy additional space but sometimes fail to operate properly. Also because of their length, joints have to be provided in the hoses and such joints can be objectionable.

It is an object of the present invention to provide the fuel tankers with means whereby vehicles, particularly aircraft, can be fuelled with less manpower than is at present required and in a shorter time. In accordance with the invention mechanically operated means are provided to carry the fuel from the tanker to a position near the aircraft fuelling apertures. Such means may be, for example, a ram which may be extended, or retracted, as required and fuel may be pumped through a tubular passage in the ram, or through a hose attached thereto; for refuelling operations again the means may be in the form of a jointed arm which, when not in use, is held retracted on the tanker and which is power operated, for refuelling operations, to extend outwardly, so that it may be extended from the tanker to a position near a filling aperture in the aircraft; the jointed arm may carry a suitable length of flexible hosing. Alternatively, the jointed arm may be of tubular construction and provided with fluid-tight joints. The fuel may be pumped through the tube so formed, relatively short lengths of flexible hosing being provided at each end for attachment to the fuel tank of the tanker and to a filling aperture of the aircraft. The jointed arm is extended and retracted by power-operated means of known type which may be operated by the driver of the tanker. With such means the refuelling operation can be carried out by the driver alone. Furthermore, the jointed arm may carry a platform so that the tanker also provides its own platform to enable the fuelling apertures to be reached for attaching the fuel hose to them. In a modification of this form of the invention, where the aforesaid arm supports a length of flexible hose, the hose may be permitted a degree of lengthwise movement relative to the arm and a small reel may be provided on the tanker to accommodate any desired additional length of hosing.

The invention is further illustrated, by way of example, in the accompanying drawings wherein.

Figure 1:
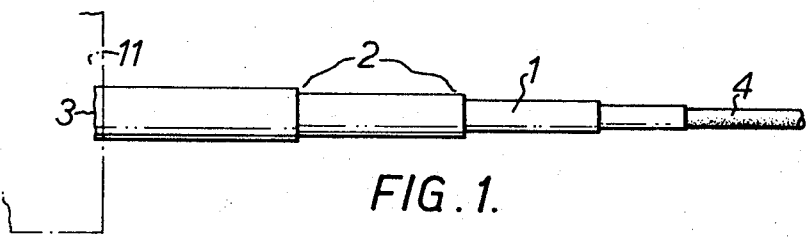
FIG. 1 shows a retractable tubular ram.
Figure 2:
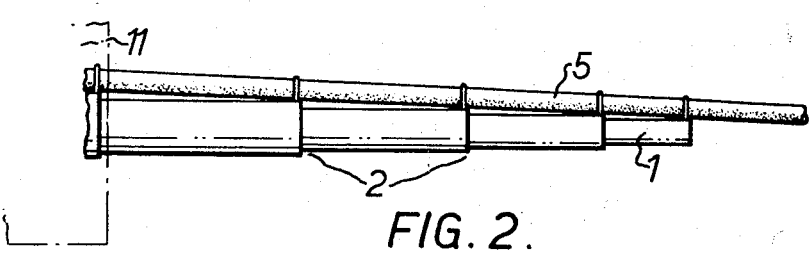
FIG. 2 shows a retractable ram supporting a delivery hose.

Referring to FIGS. 1 and 2 of the drawings, fuel delivery means may comprise a retractable ram 1, jointed at 2, which may be hollow as shown at 3, terminating in a length of flexible hose, 4 (FIG. 1), or which may carry a flexible hose 5 (FIG. 2).

Figure 3:
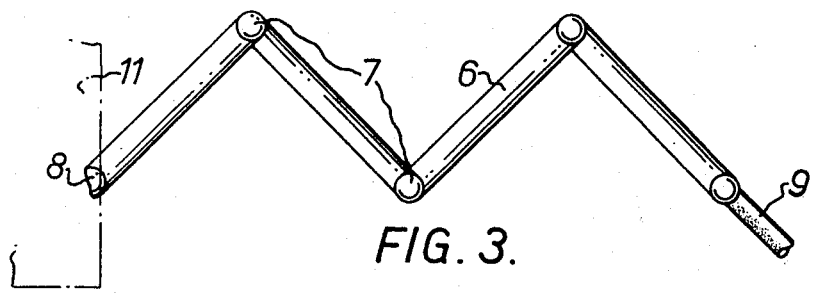
FIG. 3 shows a tubular jointed arm.
Figure 4:
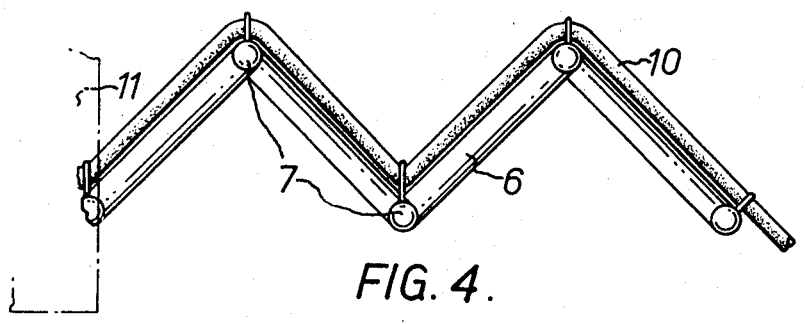
FIG. 4 shows a jointed arm supporting a delivery hose.

FIGS. 3 and 4 show retractable fuel delivery means in the form of an arm 6, jointed at 7, which may be hollow as shown at 8, terminating in a length of flexible hose 9 (FIG. 3), or may carry flexible hose 10 (FIG. 4).

The retractable means 1 and 6 will be attached in known manner to the fuel cock of a tanker schematically indicated at 11.

What is claimed is:

1. Apparatus for delivering fuel from a fuel tanker to an aircraft which comprises a retractable tubular arm having one end movably attached to said tanker, said arm comprising a plurality of individual telescoping members, a fuel hose having an external diameter which is smaller than the smallest internal diameter of any of said telescoping members, said fuel hose being housed within said tubular arm, a reel positioned on said tanker and attached to move said fuel hose with respect to said arm and means on said tanker for extending and retracting said arm.

2. The apparatus of claim 1 wherein said fuel hose terminates in a length of flexible hose and means are provided on the end of said flexible hose for coupling the same to the fuel tank of said aircraft.

References Cited

UNITED STATES PATENTS

| | | | |
|---|---|---|---|
| Re. 17,008 | 6/1928 | Tolle et al. | 222—527 XR |
| 139,416 | 5/1873 | O'Brien | 138—120 XR |
| 1,185,459 | 5/1916 | Worley | 138—120 |
| 2,648,201 | 8/1953 | Marancik et al. | 141—388 |
| 2,915,081 | 12/1959 | Warren | 137—615 XR |
| 2,948,306 | 8/1960 | Kuraeff | 222—178 XR |
| 3,114,392 | 12/1963 | Harper | 137—615 |
| 3,199,553 | 8/1965 | Garrett et al. | 141—388 |
| 3,281,080 | 10/1966 | Hogg | 239—212 |
| 3,291,256 | 12/1966 | Eitel | 242—86.5 XR |

SAMUEL SCOTT, *Primary Examiner.*

U.S. Cl. X.R.

137—615